United States Patent
Eckard et al.

(10) Patent No.: US 7,580,425 B1
(45) Date of Patent: Aug. 25, 2009

(54) FACILITATING BANDWIDTH ALLOCATION IN A PASSIVE OPTICAL NETWORK

(75) Inventors: David Eckard, Garner, NC (US); Andras Kovacs, Reston, VA (US); Kenneth Waters, Garner, NC (US)

(73) Assignee: Alcatel Lucent, Paris (FR)

( * ) Notice: Subject to any disclaimer, the term of this patent is extended or adjusted under 35 U.S.C. 154(b) by 814 days.

(21) Appl. No.: 11/019,068

(22) Filed: Dec. 21, 2004

(51) Int. Cl.
*H04J 3/22* (2006.01)

(52) U.S. Cl. .................. 370/468; 370/537; 370/395.4

(58) Field of Classification Search ............ 370/395.4, 370/537

See application file for complete search history.

(56) References Cited

U.S. PATENT DOCUMENTS 6,721,797 B1 * 4/2004 Kim ........................ 709/232
6,980,519 B1 * 12/2005 Horn et al. ................ 370/235

* cited by examiner

Primary Examiner—Duc C Ho

(57) ABSTRACT

A single grant generating apparatus has the responsibility of generating grants and grant rates for multiple ONTUs and grant patterns of a PON system. Accordingly, the single grant generating apparatus must perform bandwidth allocation functionality for the ONTUs of the PON in a serial manner. Disclosed bandwidth allocation approaches accomplish automated spacing of grants for a plurality of ONTUs in a balanced and uniform manner is accomplished whereby improved bandwidth allocation efficiency and resolution is provided for a PON system. By improving bandwidth allocation efficiency and resolution, a greater number of subscribers can be subscribed to PON services on a PON. This balanced and uniform manner of generating grants dramatically reduces the potential of grants clumping too closely together.

20 Claims, 5 Drawing Sheets

FACILITATING BANDWIDTH ALLOCATION IN A PASSIVE OPTICAL NETWORK

FIELD OF THE DISCLOSURE

The disclosures made herein relate generally to passive optical networks and more particularly to methods and systems configured for facilitating bandwidth allocation in a passive optical network.

BACKGROUND

Passive Optical Networking (PON) enables the shared use of fiber for services such as data, voice and video over most of the distance between a central office and service subscriber sites. PON is significantly less expensive to deploy and operate due to the compact size and passive nature of much of the equipment comprised by the PON facilities. For example, a passive optical splitter that fans the fiber out to service subscribers in a PON is relatively small, uses no electronics and requires no power source.

Current and emerging PON solutions offer cost-effective, end-to-end solutions that are capable of delivering a combination of high-demand services. Specific examples of such current and emerging PON solutions include Broadband PON (BPON), Ethernet PON (EPON) and Gigabit PON (GPON). Examples of services that can be provided via such PON solutions include various types of telephony services, data transmission services and video services. Signals for such services are transported optically from the central office (CO) or headend (HE) to an optical-network termination unit (ONTU) at a service subscriber's site. The ONT is configured for providing optical network termination functionality and, in some implementations, to also provide conventional network interface device functionality.

A bandwidth allocation mechanism allows for bandwidth allocation for active ONTUs to be adjusted dependent upon factors such as real-time bandwidth requirements, QOS commitments and the like. Various conventional bandwidth allocation mechanisms, such as those solutions utilizing idle-cell detection and buffer status reporting, are known. Such conventional dynamic bandwidth allocation solutions are typically implemented via hardware, software, firmware or a combination thereof.

One limitation of conventional bandwidth allocation approaches that they rely on a fixed size RAM (Random Access Memory) block for storing the grants. In such conventional bandwidth allocation approaches, the block increments the index and points to the next entry in the table each time a grant is sent to an ONTU. This operation continues until the index pointer is at the end and it wraps around to the beginning. A drawback of this approach to bandwidth allocation is that it is limited in its ability to achieve a constant grant rate for a particular ONTU. The reason for this limitation is that processor functionality of such conventional bandwidth allocation approaches is limited in their ability to space the grants out a balanced and constant manner. Another drawback is that multiple grant generators are required for generating grants for the plurality of ONTUs comprised by a PON.

Therefore, methods and systems configured for facilitating bandwidth allocation functionality in a manner that overcomes drawbacks and limitations associated with conventional approaches for facilitating bandwidth allocation functionality would be novel, useful and advantageous.

SUMMARY OF THE DISCLOSURE

Embodiments of systems, apparatuses and methods in accordance with the inventive disclosures made herein are configured for facilitating bandwidth allocation functionality in a manner that at least partially overcomes drawbacks and limitations associated with conventional approaches for facilitating bandwidth allocation functionality. Specifically, such systems, apparatuses and methods accomplish automated spacing of grants for a plurality of ONTUs in a balanced and uniform manner is accomplished whereby improved bandwidth allocation efficiency and resolution is provided for a PON system. By improving bandwidth allocation efficiency and resolution, a greater number of subscribers can be subscribed to PON services on a PON. Additionally, improving bandwidth allocation efficiency and resolution enables time division multiplexing of ONTU transmissions to be facilitated more efficiently relative to available bandwidth resources.

This balanced and uniform manner of generating grants dramatically reduces the potential of grants clumping too closely together. Having a uniform grant generation mechanism is essential for providing good quality-of-service (QOS) levels for subscribers. A processor (e.g., a PON processor or on-board processor of a grant generating apparatus) has the responsibility of limiting the potential of over-subscription of grants for the ONTUs. In one embodiment, grant generation apparatuses in accordance with the inventive disclosures made herein comprise hardware for controlling the PON processor. The hardware relies on interaction with firmware to reliably allocate bandwidth among multiple ONTUs of a PON system.

A single grant generating apparatus having a single grant generator is utilized and responsible for generating grants and grant rates for multiple ONTUs and grant patterns of the PON system. This means that the grant generating apparatus must perform bandwidth allocation functionality for the ONTUs of the PON in a serial manner. Because bandwidth allocation operations for the PONS occur relatively infrequently compared to the operating speed of the apparatus (i.e., hardware) generating grants, ONTUs of the PON will functionally view the grant generating apparatus as a parallel system. In this manner, all of the ONTUs will perform as though they each have their own grant generating apparatus/grant generator that are generating grants at effectively the same time (i.e., effectively in parallel).

In view of grant generation for the ONTUs being performed in a seemingly independent manner, it is possible for grants for all ONTUs to be generated in essentially a common grant generation cycle. In one embodiment, to prevent too large an amount of grants from suddenly overloading a serial data stream, all of the generated grants are channeled into a single FIFO (first-in-first-out) buffer. The FIFO buffer then releases grants into the serial data stream to the PON processor at prescribed (e.g., preset) time intervals.

Bandwidth allocation functionality may be configured for facilitating bandwidth allocation in a dynamic and/or static manner, wherein such bandwidth allocation can be dynamically or statically controlled by external means. In one embodiment of dynamic bandwidth allocation, idle-cell detection methodologies are preferably implemented for generating grant rates. When dynamic bandwidth allocation is being utilized, the amount of bandwidth allocated to ONTUs by a PON processor is controlled for limiting the potential of over-subscription of grants.

BRIEF DESCRIPTION OF THE DRAWING FIGURES

DETAILED DESCRIPTION OF THE DRAWING FIGURES

Figure 1:
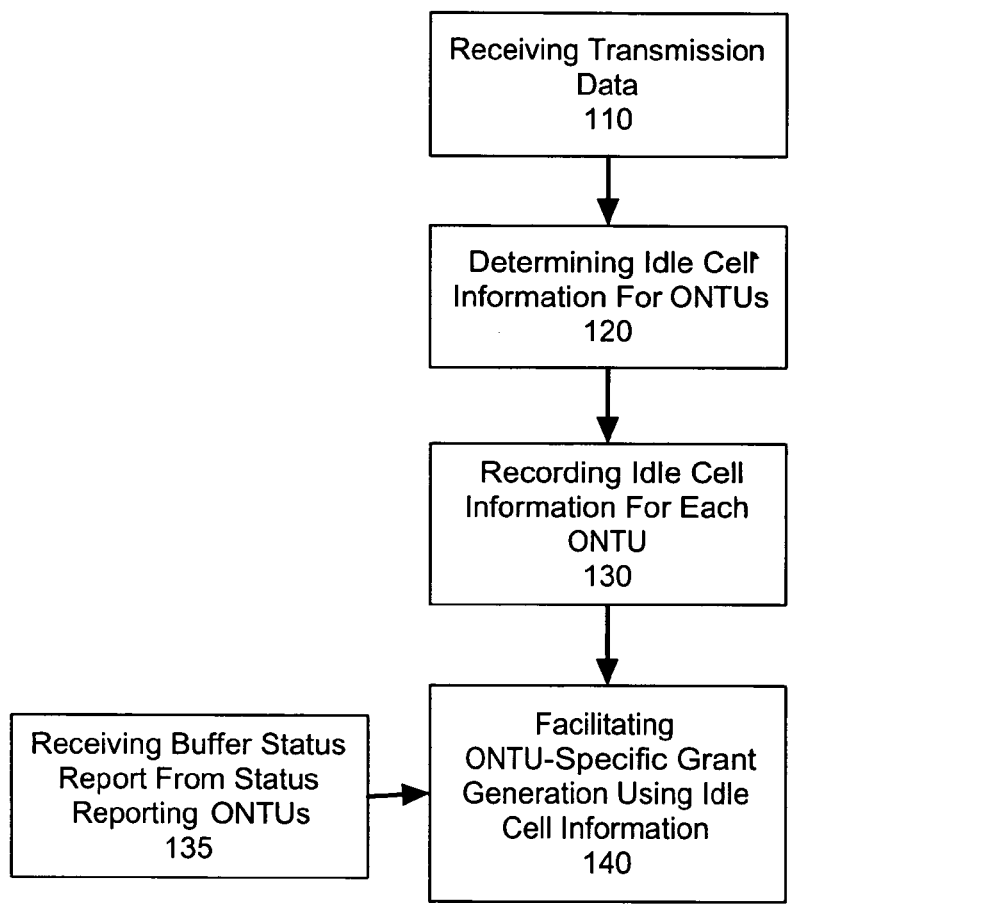
FIG. 1 depicts an embodiment of a method for facilitating bandwidth allocation functionality in accordance with the inventive disclosures made herein.

FIG. 1 depicts an embodiment of a method 100 for facilitating bandwidth allocation functionality in accordance with the inventive disclosures made herein. An operation 110 is performed for receiving transmission data from a plurality of optical network termination units (ONTUs) of a passive optical network (PON) system. The transmission data includes idle cell and non-idle cell information, such as that comprised by a serial datastream of a PON. In response to receiving the transmission data (e.g., in parallel with the transmission data is being received), an operation 120 is performed for determining idle cell information for each of the ONTUs. Such determined idle cell information includes, but is not limited to, the number of idle cells and a buffer status report that may include idle cell count information.

In response to determining the idle cell information, an operation 130 is performed for recording the idle cell information for subsequent access and use. Storing the idle cell information as respective entries in a register or as an entry in a respective register are examples of recording the idle cell information After determining the idle cell information and/or in response to performing an operation 135 for receiving a buffer status report from any status reporting ONTUs, an operation 140 is performed for facilitating ONTU-specific grant generation dependent upon the idle cell information determined for each one of the ONTUs. In one embodiment, the buffer status report is facilitated by a first-in-first-out (FIFO) buffer that delivers information directly to an appropriate processor involved with facilitating the method 100.

Figure 2:
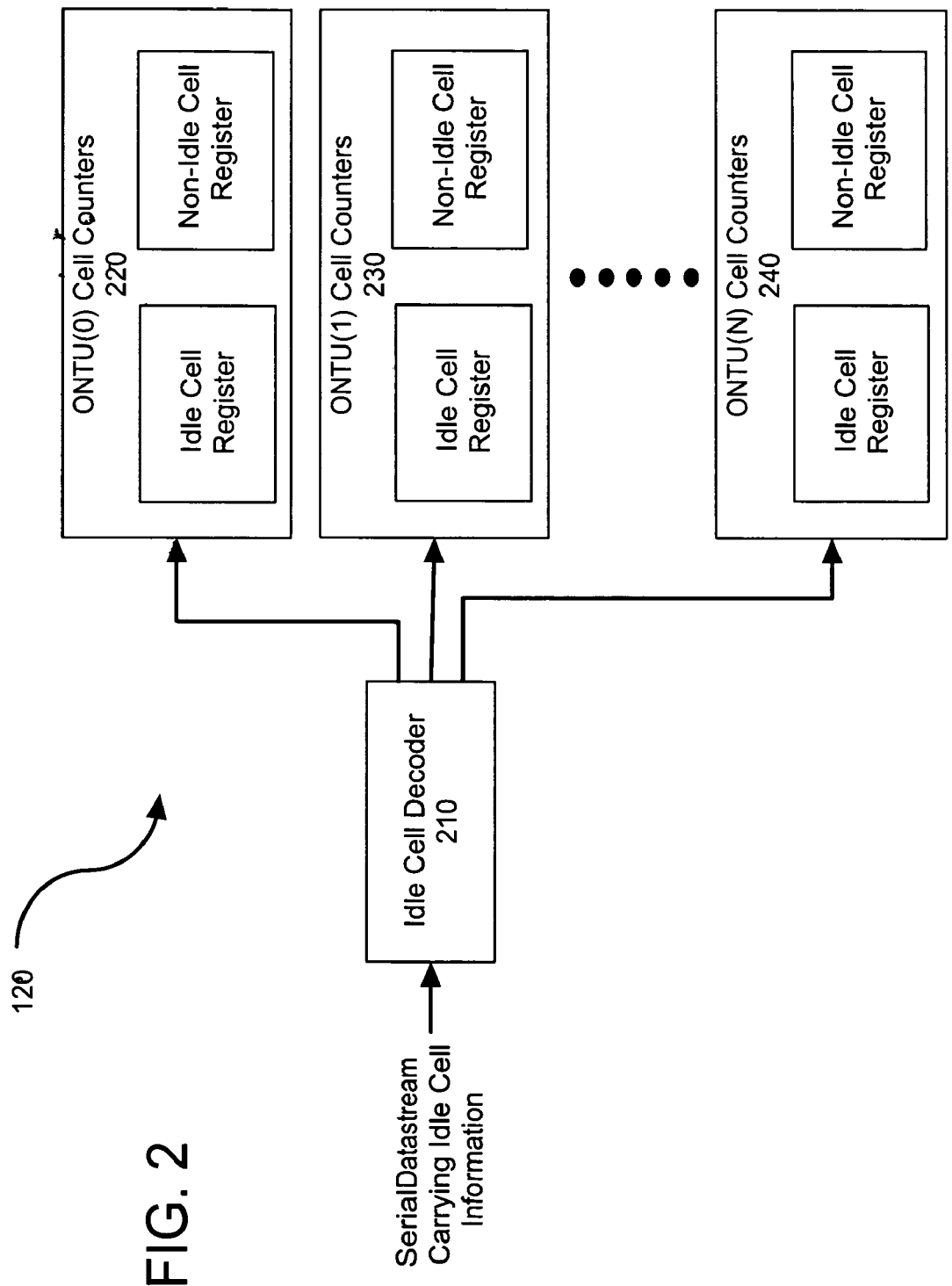
FIG. 2 depicts an embodiment of an operation for determining idle cell information in accordance with the inventive disclosures made herein.

FIG. 2 depicts an embodiment of the operation 120 for determining idle cell information. In one embodiment, such determination of idle cell information is facilitated at a physical layer (i.e., PHY layer) of the PON. An idle cell decoder 210 (e.g., at the PHY layer) receives a serial data stream carrying idle cell information (i.e., transmission data) from each of the ONTUs. The idle cell decoder 210 is configured for decoding idle cell information (e.g., header information) to determine which one of the plurality of ONTUs each idle cell is associated. After such determination, ONTU idle cell counters (e.g., at the PHY layer) for each of the ONTUs (e.g., idle cell counters 220, 230, 240) facilitate counting of respective idle cells and respective non-idle cells. The number of idle cells and the number of non-idle cells for each of the ONTUs are then stored in respective storage locations (not specifically shown) such as, for example, respective count registers.

Figure 3:
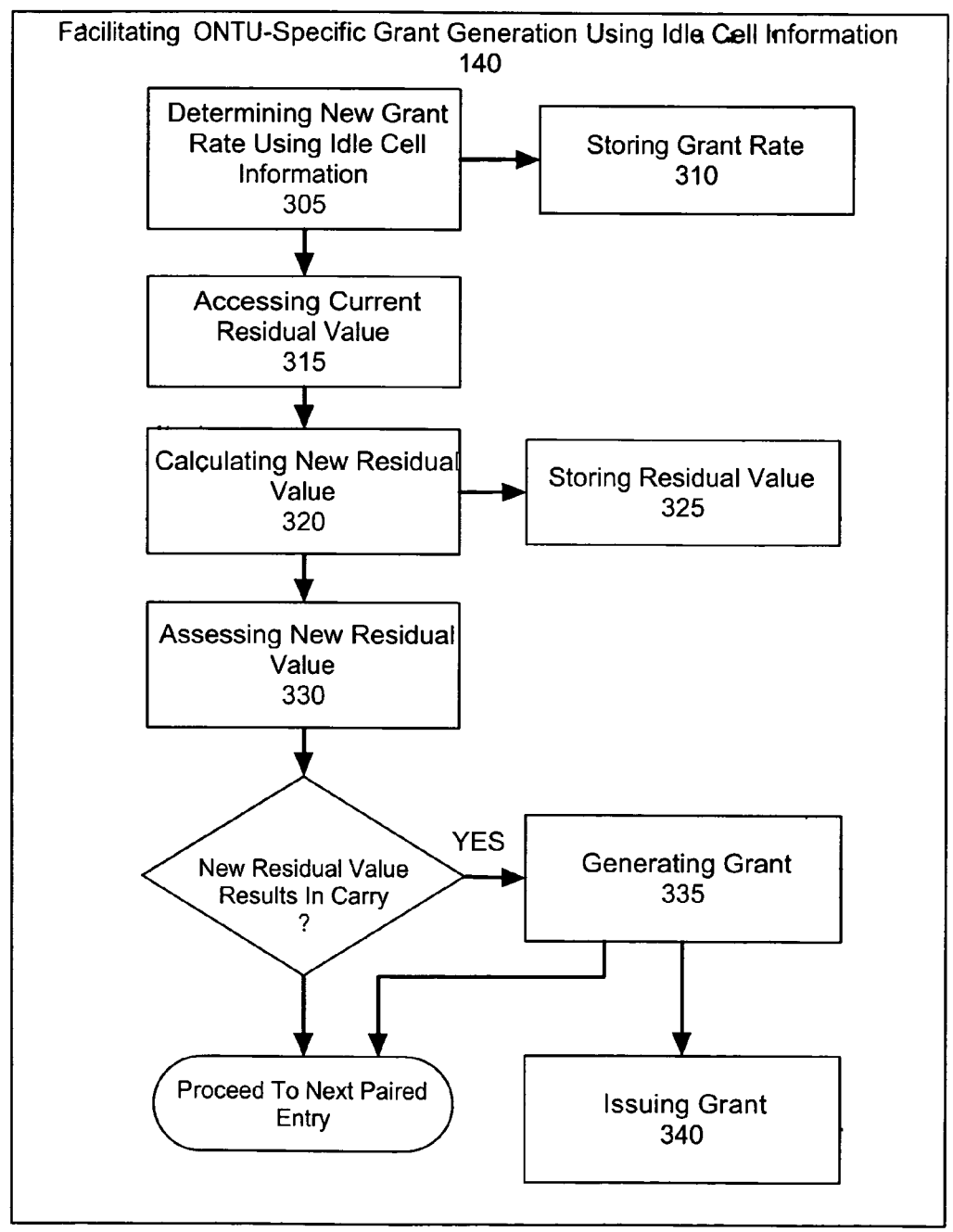
FIG. 3 depicts an embodiment of an operation for facilitating ONTU-specific grant generation dependent upon idle cell information in accordance with the inventive disclosures made herein.

FIG. 3 depicts an embodiment of the operation 140 for facilitating ONTU-specific grant generation dependent upon the idle cell information. For a particular ONTU, a step 305 is performed for determining a new grant rate for the particular ONTU (e.g., ONTU (0)). In one embodiment of such determination, idle cell information (e.g., as determined directly or as received via a buffer status report) is used for determining whether an existing grant rate for a particular ONTU is too large or too small. The new grant rate is, for example, calculated with idle cell information being one variable in the calculation.

The result of the grant rate calculation is a grant rate that more closely approximates the actual required grant rate rather than one that is considerably too big or too small. Accordingly, the determination of idle cell information and its use in the grant rate calculation represents system-managed dynamic bandwidth allocation functionality. The functionality of determining the idle cell information and determining the new grant rate represent a grant rate setting process in accordance with the inventive disclosures made herein.

It is disclosed herein that, optionally, the new grant rate may be manually specified. For example, a system administrator may analyze transmission data and specify a revised grant rate based on assessment of the idle cell information. However, such a manual approach sacrifices a considerable degree of optimization of bandwidth allocation when compared to dynamic bandwidth allocation functionality enabled by system-implemented grant rate generation.

After determining the new grant rate, a step 310 is performed for storing the new grant rate as a current grant rate (e.g., in a respective ONTU grant rate register) and a step 315 is performed for accessing a current residual value (e.g., from a respective ONTU residual value register). After accessing the current residual value, a step 320 is performed for calculating a new residual value by adding the new grant rate to the current residual value (i.e., performing an adder process), followed by performing a step 325 for storing the new residual value as a current residual value (e.g., in a respective ONTU grant rate register).

Accordingly, the new grant rate becomes the grant rate utilized until a new grant rate is determined and the new residual value become the current residual value that is accessed during the next execution of the step 315 for accessing the current residual value. The new grant rate and current residual value represent a paired entry of information (i.e., as stored in respective registers) for the particular ONTU. A first entry of each the paired entry is the current grant rate and a second entry of the paired entries is the current residual value.

In response to calculating the new residual value, a step 330 is performed for assessing the new residual value for determining whether the adder function performed at the step 325 results in a carry (i.e., a carry flag) being set for the particular ONTU. In one embodiment, the carry is set in response to the result of the adder process being not less than a prescribed number of intervals (i.e., data transmission intervals). If the result of the adder process results in a carry, a step 335 is performed for generating a grant for the particular ONTU and the method 100 then proceeds with facilitating ONTU-specific grant generation for the remaining ONTUs. Otherwise, the method 100 proceeds directly with facilitating ONTU-specific grant generation for the remaining ONTUs. In this manner, ONTU-specific grant generation is performed for n ONTUs (e.g., ONTU (0) through ONTU (n)) in a sequential manner. After performing the step 335 for generating the grant, a step 340 is performed for issuing the grant for being acted on by the PON system.

In one embodiment, issuing the grant is preferably performed in a manner whereby flow control of the grant and other issued grants is facilitated. Such flow control includes releasing grants in a first-in-first-out manner from a grant-buffering device at a prescribed interval of time from release of other grants. Accordingly, this approach to flow control limits the potential for too large an amount of grants from suddenly overloading a serial data stream.

Figure 4:
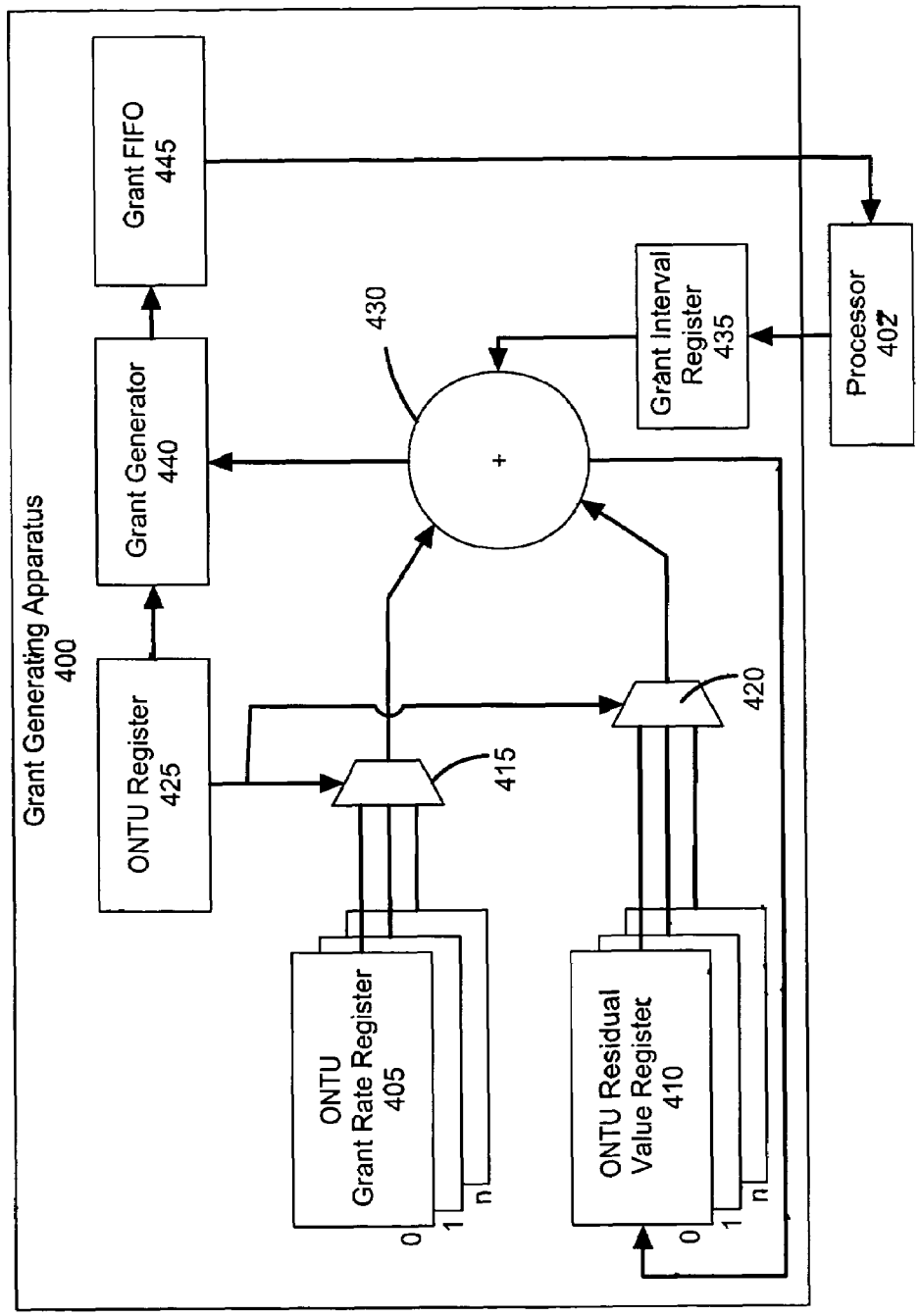
FIG. 4 depicts an embodiment of a grant generation apparatus configured for enabling facilitation of bandwidth allocation in accordance with the inventive disclosures made herein.

FIG. 4 depicts an embodiment of a grant generation apparatus 400 configured for enabling facilitation of bandwidth allocation in accordance with the inventive disclosures made herein. The grant generation apparatus 400 is capable of facilitating bandwidth allocation in accordance with the method depicted in FIG. 1. For facilitating such grant generation and/or implementing such grants, the grant generation apparatus 400 is connected to a processor 402. In one embodiment, the processor 402 exclusively facilitates grant generation functionality (i.e., an on-board processor associated with the grant generation apparatus 400) and a PON processor facilitates PON functionality such as, for example, reception and transmission of data. In another embodiment, the PON processor facilitates grant generation functionality and PON functionality.

The grant generation apparatus 400 includes a plurality of ONTU grant rate registers 405, a plurality of ONTU residual value registers 410, a grant rate register multiplexer 415, a residual value register multiplexer 420, an ONTU register 425, an adder device 430, a grant interval register 435, a grant generator 440 and a grant FIFO 445. The grant rate register multiplexer 415 is connected between the plurality of ONTU grant rate registers 405 and the adder device 430. The residual value register multiplexer 420 is connected between the plurality of ONTU residual value registers 410 and the adder device 430. The ONTU register is connected between the ONTU grant rate registers 405, the ONTU residual value registers 410 and the grant generator 440. The adder device 430 is connected between the grant rate register multiplexer 415, the residual value register multiplexer 420, the grant interval register 435 and the grant generator 440.

The ONTU grant rate registers 405 and the ONTU residual value registers 410 store grant rates and residual values, respectively, for respective ONTUs. The ONTU register 425 stores information associating each one of the ONTU grant rate registers 405 and ONTU residual value registers 410 with respective ONTUs. Together, the ONTU register 425, the grant rate register multiplexer 415 and the residual value register multiplexer 420 enable selective access of paired entries of information (i.e., the grant rate and residual value) from corresponding pairs of the ONTU grant rate registers 405 and ONTU residual value registers 410. Additionally, the ONTU register 425 enables coordinated grant generation for currently accessed paired information (i.e., currently accessed ONTU grant rate register and ONTU residual value register).

In one embodiment, the adder device 430 includes 16-bit arithmetic logic unit that adds the grant rate register and the residual register. The adder device 430 is configured for setting a carry flag in response to the adder operation producing a specified result. The carry flag indicates that a grant is to be generated for the current ONTU being processed.

The various components of the grant generating apparatus 400 act jointly and/or individually to accomplish various functionalities. The ONTU grant rate registers 405, the ONTU residual value registers 410, grant rate register multiplexer 415, the residual value register multiplexer and the ONTU register 425 jointly act as a means for enabling selective access of paired entries of information. The adder device 430 acts as a means for adding corresponding entries of the ONTU grant rate registers 405 and the ONTU residual value registers 410 whereby a result for each one of the pairs is generated. The adder device 430, the grant interval register 435 and the grant generator 440 act jointly as a means for generating grants for all of the paired entries in response to the result for a particular instance of the adding operation being not less than a prescribed number of intervals (i.e., as prescribed by a value stored in the grant interval register 435. The ONTU register 425 is a shared element of the means for enabling selective access and the means for generating grants (i.e., designating an ONTU for which corresponding operations are being performed). The grant FIFO 445 serves as a means for facilitating flow control to release grants in a first-in-first-out manner at a prescribed interval of time. In doing to, the FIFO 445 acts to prevent too large an amount of grants from suddenly overloading the serial data stream of the PON. The single FIFO also provides fairness since each ONTU grant generator can only produce one grant each cycle (2.88 us). If too many grants are produced and the FIFO begins to overflow, then the operator is alerted as the amount of upstream bandwidth is oversubscribed.

The processor 402 processes instructions (e.g., of software) for facilitating grant generation functionally enabled by the grant generation apparatus 400. Specifically, the processor 402 is configured for updating the ONTU grant rate registers 405 for a particular interval in response to facilitating determination of new grant rates (e.g., dependent upon idle cell information). The interval is determined by the instructions and is directly related to the response time that an OLT (i.e., optical line termination) has to react with supplying more or less grants.

EXAMPLE

Determination of Grant Condition for ONTU

A grant rate is enter into an ONTU grant rate register of a grant generation apparatus (e.g., via a manual or system-implemented means). The grant rate is a value between 1 and $2^{16}-1$ and represents how many grants are produced. Every 2.88 microseconds (i.e., the period of an upstream cell), logic of the grant generation apparatus adds each of the ONTU grant rate registers with its respective residual value register. For each grant rate and grant residual pair, there is a 16-bit result and possibly a carry/overflow indication. The carry bit indicates that a grant should be produced for a particular ONTU during the current grant pattern (e.g., round robin processing of the ONTUs). The actual 8-bit grant pattern is stored in a FIFO that goes to a PON physical layer ASIC (application specific integrated circuit).

Where the grant rate has a value of 1, it will take 65536 intervals (defined as 2.88 us) for a grant to be produced. This yields a grant rate of 1 grant per 65536–2.88 microsecond intervals or 5.29 grants per sec. Excluding overhead of upstream cells, this can be computed into ATM bandwidth by 424 bits/grant*5.29 grants per sec=2.248 kbps. Therefore, upstream bandwidth can be adjusted with 2.248 kbps granularity.

Similarly, if a grant rate value of 16384 is entered into the grant rate register, a grant is generated every four 2.88 microsecond timeslot intervals, as shown below.

| timeslot | residual value | grant generation |
|---|---|---|
| 0 | 16384 | no grant |
| 1 | 32768 | no grant |
| 2 | 49152 | no grant |
| 3 | 0 | grant produced for ONTU |
| 4 | 16384 | no grant |

Embodiments of apparatuses for enabling facilitation of bandwidth allocation functionality in accordance with the inventive disclosures made herein (e.g., the apparatus 400 depicted in FIG. 4) include a single grant generator per PON. This means that such apparatuses process bandwidth for ONTUs in a one-by-one manner (i.e., series processing). However, because bandwidth allocation recalculation in dynamic bandwidth allocation mode occurs infrequently compared to the speed of the hardware generating grants (i.e., idle cell counting devices and the grant generating apparatus), an external system (e.g., an ONTU) will generally view the grant generation as a parallel process, where all ONTUs have their own grant generators and at least a portion of these grant generators are generating grants at the same time.

Figure 5:
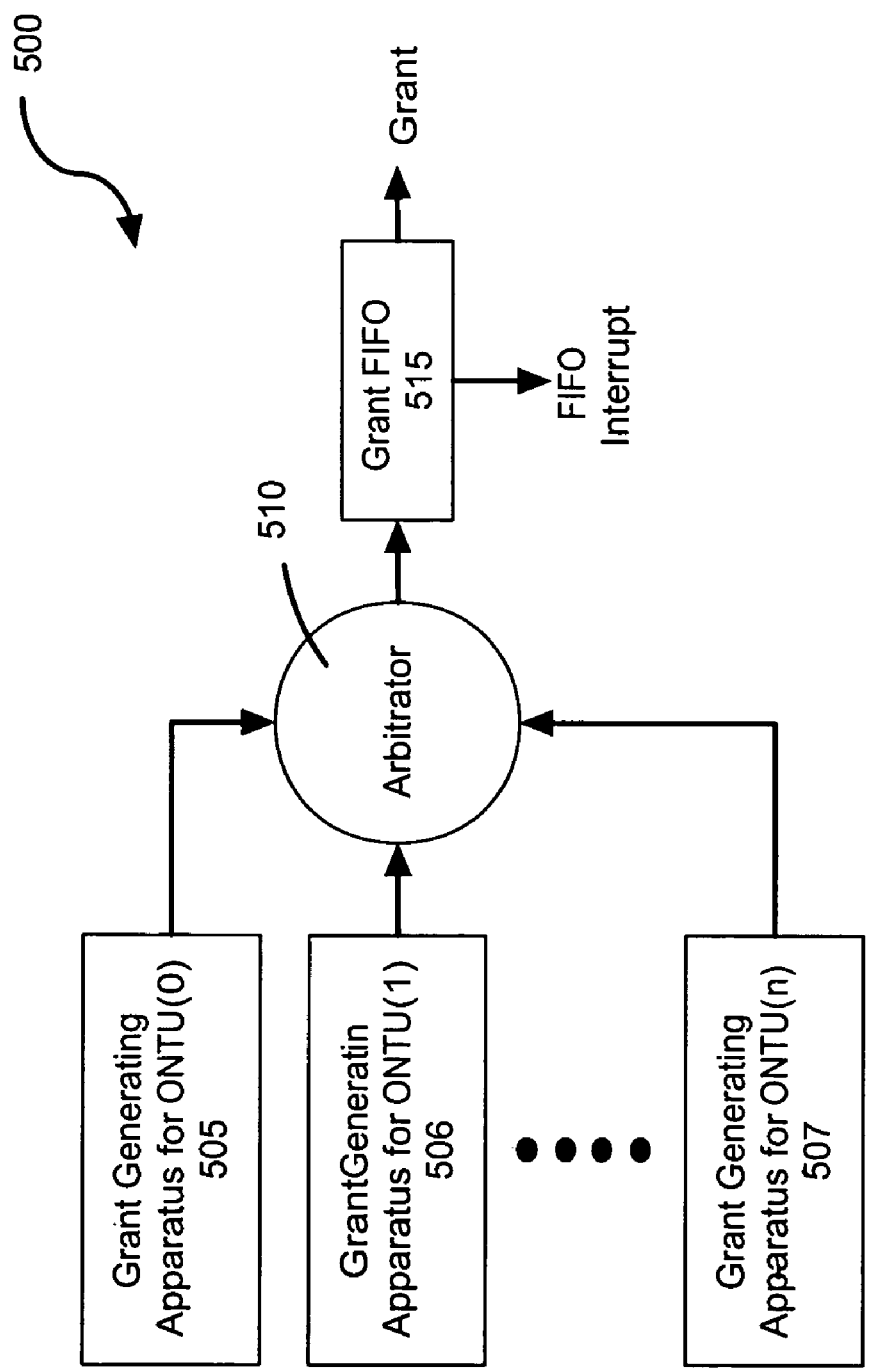
FIG. 5 is an embodiment of a schematic depicting the concept of all ONTUs having their own grant generators and their generators generate grants at the same time, which is functionally enabled by the grant generation apparatus 400 depicted in FIG. 4.

FIG. 5 is an embodiment of schematic 500 depicting the concept of all ONTUs having their own grant generators (which they do not) and their generators generate grants at the same time (which does not happen). A plurality of grant generating apparatuses (505, 506, 507) is connected to an arbiter 510. Each one of the grant generating apparatuses 505 is associated with a respective ONTU. The arbiter 510 is responsible for periodically receiving a carry bit from each of the grant generating apparatuses 505. In response to receiving the carry bits, they are inserted in the actual grant pattern into a grant FIFO 515, which issues the grants at a prescribed interval. If the grant FIFO 515 fills to a prescribed level (i.e., as specified via control software), then an interrupt is generated to the respective system processor to take appropriate action. This action usually is to scale back the grant rate registers so that the grant FIFO 515 doesn't overfill and drop grants.

Referring now to computer readable medium, methods, processes and/or operations adapted for carrying out bandwidth allocation functionality as disclosed herein are tangibly embodied by computer readable medium having instructions thereon for carrying out such functionality. In one specific embodiment, the instructions are tangibly embodied for carrying out the method 100 disclosed above to facilitate bandwidth allocation functionality. The instructions may be accessible by one or more data processors (e.g., a logic of a grant generation apparatus) from a memory apparatus (e.g. RAM, ROM, virtual memory, hard drive memory, etc), from an apparatus readable by a drive unit of the data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon a computer program (i.e., a set of instructions) configured for carrying out bandwidth allocation functionality in accordance with the inventive disclosures made herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A grant generation apparatus, comprising:
   means for enabling selective access of paired entries of information, wherein each one of said paired entries corresponds to a respective one of a plurality of optical network termination units and wherein a first entry of each one of said paired entries is a grant value and a second entry of each one of said paired entries is a residual value;
   means for adding corresponding entries of said means for enabling selective access whereby a result for each one of said pairs is generated, wherein said means for adding is coupled to said means for enabling access;
   means for generating grants coupled to said means for adding, wherein said means for generating grants is configured for generating grants corresponding to all of said paired entries and wherein said means for generating grants is configured for generating a grant for a particular instance of said means for adding in response to the result for the particular instance of said adding being not less than a prescribed number of intervals.

2. The apparatus of claim 1 wherein:
   said means for enabling selective access further for enabling access of a plurality of paired registers;
   each one of said paired registers corresponds to a respective one of said optical network termination units;
   a first one of said paired registers is a grant rate register having the grant value for the respective one of said optical network termination units stored therein; and
   a second one of said paired registers is a residual value register having the residual value for the respective one of said optical network termination units stored therein.

3. The apparatus of claim 2 wherein:
   said means for enabling selective access includes at least one multiplexing device coupled to an adder device and an optical network termination unit register coupled between said means for generating grants and said means for adding; and
   the optical network termination unit register determines which one of said paired entries of information is accessible by said means for adding.

4. The apparatus of claim 1 wherein said means for generating grants includes a single grant generator.

5. The apparatus of claim 1, further comprising:
   a grant interval register coupled to the means for adding, wherein the grant register specifies the prescribed number of intervals.

6. The apparatus of claim 1, further comprising:
means for facilitating flow control of said grants, wherein said means for facilitating flow control releases said grants in a first-in-first-out manner at a prescribed interval of time.

7. The apparatus of claim 1, further comprising:
a grant interval register coupled to the means for adding and specifying the prescribed number of intervals; and
means for facilitating flow control of said grants, wherein said means for facilitating flow control releases said grants in a first-in-first-out manner at a prescribed interval of time;
wherein said means for generating grants included a single grant generator;
wherein said means for adding includes an adder device coupled to said means for generating grants;
wherein said means for enabling selective access further for enabling access of a plurality of paired registers;
wherein each one of said paired registers corresponds to a respective one of said optical network termination units;
wherein a first one of said paired registers is a grant rate register having the grant value for the respective one of said optical network termination units stored therein;
wherein a second one of said paired registers is a residual value register having the residual value for the respective one of said optical network termination units stored therein;
wherein said means for enabling selective access includes at least one multiplexing device coupled to the adder device and an optical network termination unit register coupled between said means for generating grants and said means for adding; and
the optical network termination unit register determines which one of said paired entries of information is accessible by said means for adding.

8. A method for facilitating bandwidth allocation, comprising:
performing an adder process for paired entries of information whereby a result for each one of said paired entries is sequentially generated, wherein each one of said paired entries corresponds to a respective one of a plurality of optical network termination units and wherein a first entry of each one of said paired entries is a grant rate and a second entry of each one of said paired entries is a current residual value;
generating a grant using a grant generation apparatus for all the paired entries of the adder process in response to the result for the particular instance of the adding operation being not less than a prescribed number of intervals;
replacing the current residual value of the second entry of each one of said paired entries with the result of the particular instance of the adder process after performing the adding operation.

9. The method of claim 8 wherein a single grant generator performs said generating.

10. The method of claim 8 wherein said performing the adder process, said generating the grant and said replacing the current residual value are performed sequentially for each one of said paired entries.

11. The method of claim 8, further comprising:
performing a grant rate setting process for setting the grant value for each one of said optical network termination units, wherein the grant rate setting process includes determining at least one of a number of idle cells transmitted by and the buffer status reported by each one of said optical network termination units over a prescribed duration of time and determining a grant rate for each one of said optical network termination units dependent upon at least one of the number of idle cells and the buffer status report.

12. The method of claim 8, wherein:
said generating the grant is performed by a single grant generator.

13. The method of claim 8, further comprising:
facilitating flow control of the grant, wherein said facilitating flow control includes releasing the grant in a first-in-first-out manner from a grant buffering device at a prescribed interval of time from release of other grants.

14. The method of claim 8, further comprising:
performing a grant rate setting process for setting the grant value for each one of said optical network termination units; and
facilitating flow control of the grant;
wherein said facilitating flow control includes releasing the grant in a first-in-first-out manner from a grant buffering device at a prescribed interval of time from release of other grants;
wherein the grant rate setting process included determining at least one of a number of idle cells transmitted by and the buffer statue reported by each one of said optical network termination units over a prescribed duration of time and determining a grant rate for each one of said optical network termination units dependent upon at least one of the number of idle cells and the buffer status report;
wherein a single grant generator performs said generating; and
wherein performing the adder process, generating the grant and replacing the current residual value are performed sequentially for each one of said paired entries.

15. A bandwidth allocation system, comprising:
at least one data processing device;
instructions stored in a memory processable by said at least one data processing device; and
an apparatus from which said instructions are accessible by said at least one data processing device;
wherein said instructions are configured for enabling said at least one data processing device to facilitate:
performing an adder process for paired entries of information whereby a result for each one of said paired entries is sequentially generated, wherein each one of said paired entries corresponds to a respective one of a plurality of optical network termination units and wherein a first entry of each one of said paired entries is a grant rate and a second entry of each one of said paired entries is a current residual value;
generating a grant for a particular instance of the adder process in response to the result for the particular instance of the adder process being not less than a prescribed number of intervals;
replacing the current residual value for the particular instance of said adder process with the result of the particular instance of the adder process after performing the adder process.

16. The apparatus of claim 15 wherein said performing the adder process, said generating the grant and said replacing the current residual value are performed sequentially for each one of said paired entries.

17. The apparatus of claim 15, further comprising:
performing a grant rate setting process for setting the grant value for each one of said optical network termination units, wherein the grant rate setting process includes determining at least one of a number of idle cells transmitted by and the buffer status reported by each one of said optical network termination units over a prescribed duration of time and determining a grant rate for each one of said optical network termination units dependent upon at least one of the number of idle cells and the buffer status report.

18. The apparatus of claim 15, wherein:

said generating the grant is performed by a single grant generator.

19. The apparatus of claim 15, further comprising:

facilitating flow control of the grant, wherein said facilitating flow control includes releasing the grant in a first-in-first-out manner from a grant buffering device at a prescribed interval of time from release of other grants.

20. The method of claim 15, further comprising:

performing a grant rate setting process for setting the grant value for each one of said optical network termination units; and facilitating flow control of the grant;

wherein said facilitating flow control includes releasing the grant in a first-in-first-out manner from a grant buffering device at a prescribed interval of time from release of other grants;

wherein the grant rate setting process includes determining at least one of a number of idle cells transmitted by and the buffer status reported by each one of said optical network termination units over a prescribed duration of time and determining a grant rate for each one of said optical network termination units dependent upon at least one of the number of idle cells and the buffer status reports;

wherein a single grant generator performs said generating; and wherein performing the adder process, generating the grant and replacing the current residual value are performed sequentially for each one of said paired entries.

* * * * *

UNITED STATES PATENT AND TRADEMARK OFFICE
CERTIFICATE OF CORRECTION

PATENT NO. : 7,580,425 B1
APPLICATION NO. : 11/019068
DATED : August 25, 2009
INVENTOR(S) : Eckard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this

Fourteenth Day of September, 2010

David J. Kappos
*Director of the United States Patent and Trademark Office*